United States Patent [19]

Bytzek et al.

[11] Patent Number: 4,583,962
[45] Date of Patent: Apr. 22, 1986

[54] TIMING BELT TENSIONER WITH DAMPED CONSTANT SPRING TENSIONING AND BELT TOOTH DISEGAGEMENT PREVENTION

[75] Inventors: Klaus K. Bytzek, Schomberg; Jacek S. Komorowski, Weston, both of Canada

[73] Assignee: Litens Automotive Inc., Downsview, Canada

[21] Appl. No.: 679,476

[22] Filed: Dec. 7, 1984

[51] Int. Cl.⁴ .............................................. F16H 7/12
[52] U.S. Cl. ...................................... 474/133; 474/135
[58] Field of Search ................................ 474/133, 135

[56] References Cited

U.S. PATENT DOCUMENTS

| | | | |
|---|---|---|---|
| 4,392,840 | 7/1983 | Rodocaj | 474/117 |
| 4,472,162 | 9/1984 | Hitchcock | 474/133 X |
| 4,473,362 | 9/1984 | Thomey et al. | 474/135 |
| 4,521,208 | 6/1985 | Doveri | 474/133 X |

Primary Examiner—James A. Leppink
Assistant Examiner—Frank McKenzie
Attorney, Agent, or Firm—Cushman, Darby & Cushman

[57] ABSTRACT

A timing belt tensioning device comprising a fixed structure having a spring pressed pivoted structure mounted thereon for pivotal movement about a first axis between first and second limiting positions. The pivoted structure carries a timing belt engaging pulley for rotational movement about a second axis parallel with the first axis. A one-way clutch mechanism is provided for permitting pivotal movement of the pivoted structure in a direction toward a second limiting position and for limiting the pivotal movement of the pivoted structure in an opposite direction toward the first limiting position beyond a predetermined distance measured from the nearest position of the pivoted structure to the second limiting position. The predetermined distance has a maximum dimension such as to prevent loosening of the timing belt engaged by the pulley sufficient to allow disengagement of a tooth thereof with a tooth of a timing pulley and a minimum dimension such as to accommodate normal operating low amplitude movements and thermal expansion during operation. A damping system is provided for damping the operating movements of the pivoted structure permitted by the one-way clutch mechanism.

13 Claims, 6 Drawing Figures

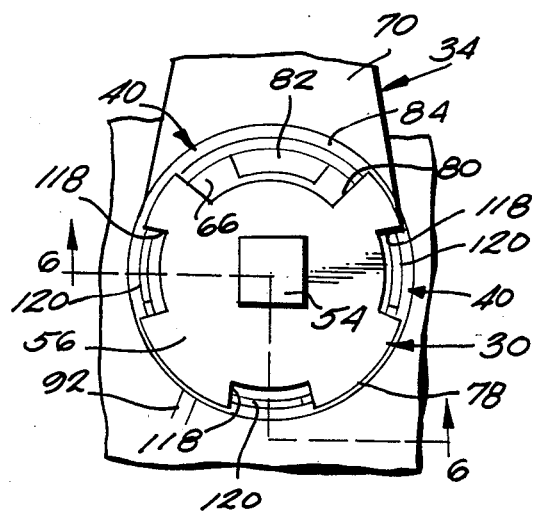
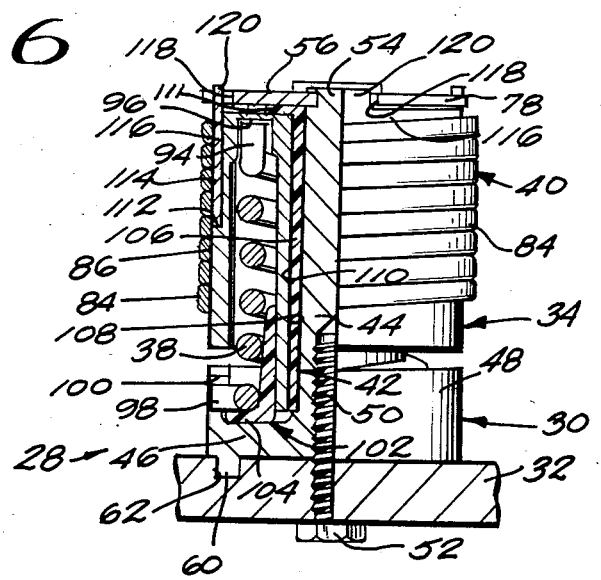

TIMING BELT TENSIONER WITH DAMPED CONSTANT SPRING TENSIONING AND BELT TOOTH DISEGAGEMENT PREVENTION

This invention relates to belt tensioners and, more particularly, to improvements in belt tensioners for use with timing belts and the like.

A timing belt trained about two cooperating timing belt pulleys is a well-known motion transmitting assembly which has economical advantages when compared with other types of assemblies such as sprocket wheel and chain assemblies or meshing gear assemblies. Because of these economical advantages, timing belts have been extensively used in automobile engines for transmitting the motion of the drive shaft to the cam shaft. In such an installation, the distance between the two shafts is fixed and, consequently, it is not possible to tension the timing belt by moving the two shafts apart. To accommodate tensioning, fixed idler pulleys are usually utilized. Such idler pulleys are usually mounted so as to provide a range of adjustment so as to readily permit installation and movement of the idler pulley into a fixed position for operation. Often, the idler pulleys are spring urged so the fixed operation position can be determined by the spring tension applied. That is, the idler pulley is moved under spring pressure into tensioning engagement with the belt under a predetermined spring tension which determines the operating position of the idler pulley. Prior to operation, however, the idler pulley is bolted or otherwise fixed into the desired operation position.

A fixed idler pulley, even when initially installed, presents a compromise between a condition in which the belt is less than optimally tight or more than optimally tight. More than optimal tightness is presented upon operation following the initial installation by virtue of the increase in tension resulting from thermal expansion between the axes of the shafts. When the engine is cold, the belt is less tight than when the engine has been at running temperature for a while. In the long run beyond the initial installation, as the belt is operated, the belt tension tends to reduce due to belt stretching and belt wear leading to a less than optimal tightness situation.

The tendency in modern automobiles is to reduce the air space in the engine compartment which results in an increase in the environmental temperatures and hence the thermal expansion to which timing belts are subjected. The result is that either the belts fail more rapidly due to excessive looseness by slipping a tooth which completely disrupts the engine timing or by breakage due to excessive tension. Such failure is most likely to occur at engine shut down where the normally slack side of the belt which is engaged by the tensioning pulley changes from slack to tight due to the tendency of the engine to reverse rotate by virtue of compressed gases trapped therein.

This trend is sufficiently noticeable that current manufacturers are considering replacing timing belts with more noisy and expensive chain and sprocket wheel assemblies. What is needed is a timing belt tensioning device which maintains a constant optimum operating tension on the timing belt at all times and, at the same time, handles peak loads, such as presented at engine shut off, in such a way as to eliminate the attendant danger of tooth disengagement.

It is an object of the present invention to provide a timing belt tensioning device which will fulfill the aforesaid need. In accordance with the principles of the present invention, this objective is obtained by providing a timing belt tensioning device which includes a fixed structure, a pivoted structure mounted with respect to the fixed structure for pivotal movement about a first axis between first and second limiting positions. A timing belt engaging pulley is rotatably carried by the pivot structure for rotational movement about a second axis parallel with the first axis. A spring is mounted between the fixed and pivoted structures for resiliently biasing the pivoted structure to move in a direction away from the first limiting position toward the second limiting position with a spring force that decreases as the pivotal structure is moved in a direction away from the first position toward the second position. A one-way clutch is provided between the fixed and pivoted structures for permitting pivotal movement of the pivoted structure in a direction toward the second limiting position and for limiting the pivotal movement of the pivoted structure in an opposite direction toward the first limiting position beyond a predetermined distance measured from the nearest position of the pivoted structure to the second limiting position. The predetermined distance has a maximum dimension such as to prevent loosening of the timing belt engaged by the pulley sufficient to allow disengagement of a tooth thereof with a tooth of a timing pulley and a minimum dimension such as to accommodate normal operating low amplitude movements and thermal expansion during operation. A damping arrangement is provided for damping the operating movements of the pivoted structure permitted by the one-way clutch.

With the arrangement of the present invention as noted above, the tensioning device normally functions in a manner which will permit normal operating movements and thermal expansion. The timing belt during such movements is maintained under constant tension by the spring. The establishment of resonance is prevented by the damping means. The one-way clutch permits this normal operation but positively prevents a movement of the timing belt engaging pulley beyond a distance which would enable a timing belt tooth to disengage from a timing pulley tooth. Moreover, both the limitation as to this distance as well as the constant belt tension is maintained as the timing belt tends to elongate due to operating time and wear.

Preferably, the spring is of the helical coil type and the one-way clutch is of the helical coil type disposed in surrounding relation to the helical coil of the spring. While any type of damping means may be provided, preferably the damping means is provided in accordance with the teachings of commonly assigned U.S. Pat. No. 4,473,362. The specific example of the damping means provided is by friction surface sliding with a damping force which decreases as the pivoted structure is moved in a direction away from the first limiting position toward the second limiting position both throughout the overall range of operation engagement of the one-way clutch and the predetermined distance of normal operation beyond which the one way clutch is operable.

It is recognized that it has been proposed to provide a belt tensioning device for a serpentine belt system of an automobile with a one-way clutch which is operable to permit the belt tensioning device to take up the tension when the belt extends but which positively prevents movement in the opposite direction. (U.S. Pat. No. 4,392,840) Such an arrangement as applied to a timing belt would aggravate the problem presented by thermal expansion rather than to accomodate it. Thus, the pulley would seek a position tensioning the belt when the latter is in a condition of greatest looseness. When thermal conditions increase under normal load conditions causing the belt to tighten, the one-way clutch connected to the tensioning pulley would prevent movement in the nontensioning direction, thus imposing a greater operating tension on the belt than optimum. Moreover, such increased tension would be applied by such an arrangement to the timing belt throughout its life.

Another object of the present invention is the provision of a tensioning device of the type described which is simple in construction, effective in operation and economical to manufacture.

These and other objects of the present invention will become more apparent during the course of the following detailed description and appended claims.

The invention may be best understood with reference to the accompanying drawings, wherein an illustrative embodiment is shown.

In the drawings:

FIG. 5 is a fragmentary front elevational view of a modified form of tensioning device embodying the principles of the present invention; and FIG. 6 is a sectional view taken along the line of 6—6 of FIG. 5.

Figure 1:
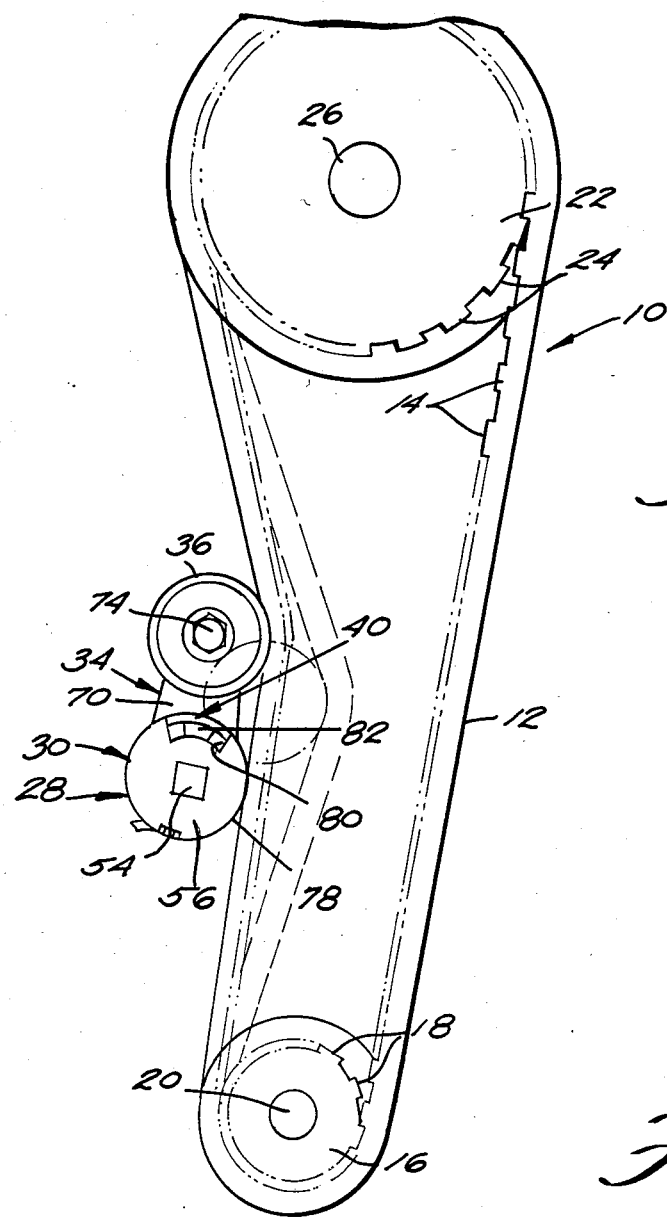
FIG. 1 is a somewhat schematic front elevational view of a timing belt assembly between the drive shaft and cam shaft of an automobile engine, having a tensioning device embodying the principles of the present invention operatively embodied therein.

Referring now more particularly to the drawings there is shown in FIG. 1 thereof an automotive engine timing belt and pulley system, generally indicated at 10, which includes a conventional flexible timing belt 12, having the usual teeth 14 on the interior periphery thereof. The timing belt 12 is trained about a drive timing pulley 16 with exterior teeth 18 connected to the output shaft 20 of the automotive engine and a driven timing pulley 22 with exterior teeth 24 connected to the cam shaft 26 of the automotive engine. Mounted in operative relation to the timing belt is a belt tensioning device, generally indicated at 28, which embodies the principles of the present invention. The belt tensioning device 28 provides for the application of a substantially constant tension to the timing belt 12 of the system 10 over an extended period of time during which the belt tends to become longer. For example, the solid line position of the belt tensioner illustrates the initial condition of the belt with the belt tensioner 28 in a minimum belt take-up position, whereas the dotted line position illustrates a maximum belt take-up position which may occur after extended use and the belt has been elongated.

Figure 2:
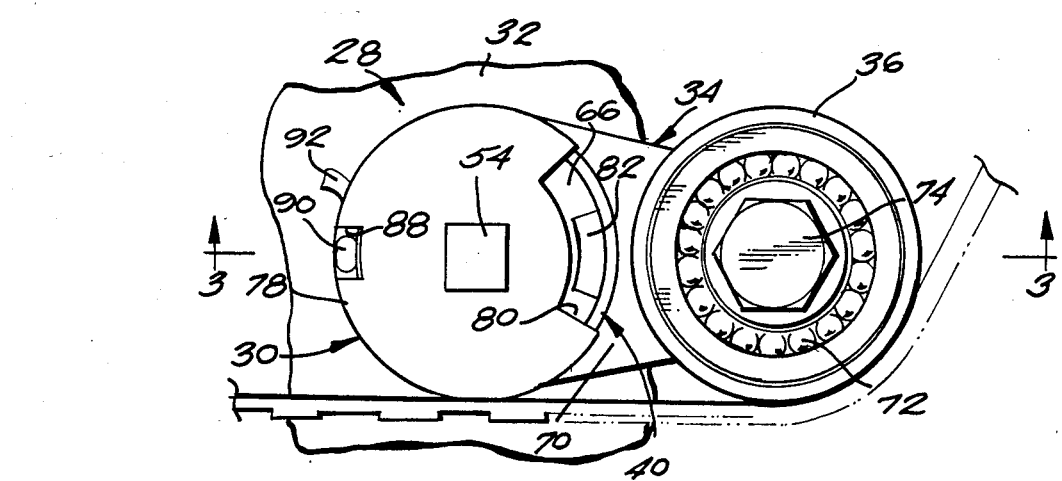
FIG. 2 is an enlarged fragmentary front elevational view of the tensioning device shown in FIG. 1.
Figure 3:
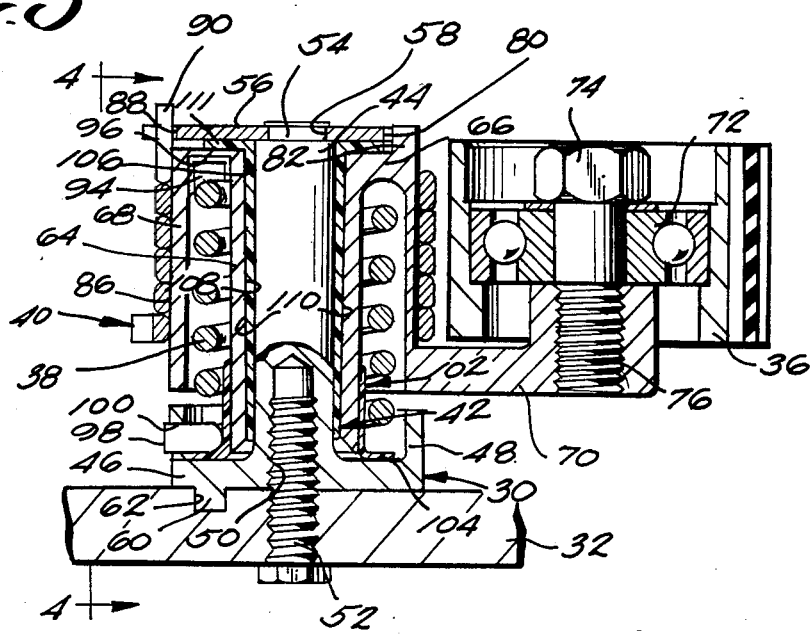
FIG. 3 is a sectional view taken along the line of 3—3 of FIG. 2.
Figure 4:
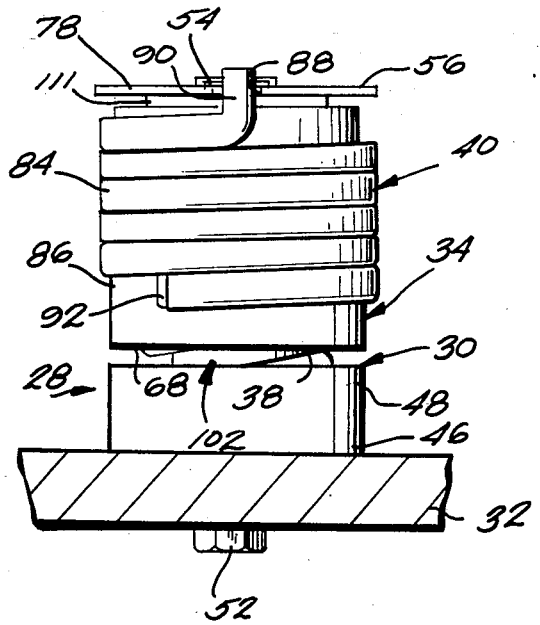
FIG. 4 is a sectional view taken along the line 4—4 of FIG. 3.

Referring now more particularly to FIGS. 2-4 of the drawings, the belt tensioning device 28 of the present invention includes a fixed structure 30 which is adapted to be secured to a bracket plate 32 or the like in a stationary position with respect to the engine block. The belt tensioning device 28 also includes a pivoted structure 34 which is mounted with respect to the fixed structure 30 for pivotal movements about a fixed first axis between the first and second limiting positions. The pivoted structure 34 carries a timing belt engaging pulley 36 for rotational movement about a second axis parallel with the first axis. A coil spring 38 (FIG. 3) is mounted between the fixed structure 30 and pivoted structure 32 for resiliently biasing the latter to move in a direction away from the first limiting position thereof toward the second limiting position with a spring force which decreases as the pivoted structure is moved in a direction away from the first position toward the second position. The second position of the belt tensioner 28 corresponds generally with the dotted line position shown in FIG. 1.

In accordance with the principles of the present invention, the belt tensioning device 28 also includes a one-way clutch mechanism, generally indicated at 40, for permitting pivotal movement of the pivoted structure 34 in a direction toward the second limiting position and for limiting the pivotal movement of the pivoted structure 34 in an opposite direction toward the first limiting position beyond a predetermined distance measured from the nearest position of the pivoted structure to the second limiting position. The predetermined distance has a maximum dimension such as to prevent loosening of the timing belt 12 engaged by the pulley 36 sufficient to allow disengagement of a tooth 14 thereof with a tooth 18 or 24 of a timing pulley 16 or 22 and a minimum dimension such as to accommodate normal operating low amplitude vibrational movements and thermal expansion during operation.

The operational movements permitted by the one-way clutch mechanism 40 are damped in order to prevent resonance. Preferably, the damping is provided as a damping means, generally indicated at 42, constructed in accordance with the teachings of the aforesaid U.S. Pat. No. 4,473,362, the disclosure of which is hereby incorporated by reference into the present specification.

The fixed structure 30 may assume a variety of different configurations; however, as shown, it is made up of a rigid core member 44 having a radial flange portion 46 formed on one end thereof which, in turn, has an axial flange portion 48 extending from the outer edge thereof. Core member 44 is generally cylindrical in shape but has a slight frustoconical slope. A central opening 50 extends longitudinally therein which is threaded to receive a bolt 52 serving to detachably secure the fixed structure 30 to the bracket 32. As best shown in FIGS. 2 and 3, opposite end of the core member 44 includes a reduced portion 54 formed with a square cross-sectional configuration. The rigid structure 30 also includes a circular end disk 56 having a square shaped central opening 58 shaped to receive the associated end portion 54 of the core member 44 which is then peened over to fix the connection. The flange portion 46 has a projection 60 formed thereon for engaging within an opening 62 formed within the bracket 32 so as to prevent the fixed structure 30 from moving with respect to the bracket about the axis of the bolt 52 and core member 44.

The pivoted structure 34 includes a tubular inner portion 64 which is disposed in surrounding relation with the core member 44, an end wall portion 66 extending radially outwardly from one end of the inner tubular portion 64 and an outer tubular portion 68 extending axially from the outer end of radial end wall portion 66 in spaced surrounding relation with the inner tubular portion 64. Extending integrally from the free end of the exterior periphery of the outer tubular portion 68 is an arm portion 70. Pulley 36 is suitably journaled on the outer end of the arm portion 70 for rotational movement about a second axis which is parallel with respect to the first axis provided by the coil member 44. As shown, a conventional ball bearing assembly 72 is connected exteriorly with the interior of the pulley 36 and interiorly with a bolt 74 suitably threadedly engaged within the arm portion 70, as indicated at 76.

In order to determine the first and second limiting positions into which the pivoted structure 34 can be moved with respect to the fixed structure 30, the exterior periphery 78 of the fixed disk 56 has formed therein a notch 80. A lug 82 is formed integrally on the end wall portion 66 of the pivoted structure 34 and extends axially outwardly therefrom into a position within the notch 80 so that the limiting positions are determined by the engagement of the lug 82 with the wall surfaces of the disk 56 defining the opposite sides of the notch 80.

Referring now more particularly to FIGS. 3 and 4 of the drawings, the one-way clutch mechanism 40 is preferably of a type which includes a helical coil spring 84. As shown, the helical coil spring 84 is a tightly wound helical coil with its interior cylindrical configuration, when unstressed, being of a size to engage a cooperating exterior cylindrical clutch surface 86. In the embodiment shown in FIGS. 3 and 4, the exterior cylindrical clutch surface 86 constitutes the exterior periphery of the outer tubular portion 68 of the pivoted structure 34. As previously indicated, the one-way clutch serves to prevent pivotal movement of the pivoted structure 34 in a direction toward the first limiting position thereof beyond a predetermined distance. This predetermined distance is preferably provided by a lost motion connection between the clutch helical coil spring 84 and the fixed structure 30.

In the embodiment shown in FIGS. 3 and 4, the lost motion connection is provided by a notch 88 formed in the periphery 78 of the fixed disk 56. The adjacent end of the clutch helical coil spring 84 is bent axially outwardly, as indicated at 90, and disposed as to extend within the notch 88. In order to provide for the manual release of the clutch helical coil spring 84, the opposite end thereof is bent radially outwardly, as indicated at 92.

With reference to FIGS. 1 and 2, it will be noted that when the pivoted structure 34 is moved in a clockwise direction through a distance sufficient to take up the lost motion connection between the end 90 and the notch 88 the end 90 of the clutch helical coil spring 84 is likewise moved in a clockwise direction. This direction of movement tends to cause the clutch helical coil spring 84 to assume a larger interior diameter and, hence, the gripping engagement between the interior periphery of the clutch helical coil spring 84 and the exterior periphery of the cylindrical clutch surface 86 is released, allowing the surface 86 to be moved into a different position displaced angularly with respect to the clutch helical coil spring 84. On the other hand, a pivotal movement of the pivoted structure 34 in the counter-clockwise direction, as viewed in FIGS. 1 and 2, toward its first limiting position through a distance sufficient to take up the lost motion connection betwen the end 90 and the notch 88 will apply a force to the end 90 tending to cause the coils of the clutch helical coil spring 84 to reduce in diameter which enhances the gripping engagement between the clutch helical coil spring 84 and clutch surface 86 and prevents any counter-clockwise movement beyond that which occurs prior to the lost motion take up.

As previously indicated, the extent of the lost motion or the predetermined distance which lost motion provides has a maximum dimension such as to prevent loosening of the timing belt 12 engaged by the pulley 36 sufficient to allow disengagement of a tooth 14 with a tooth 18 or 24 or a timing pulley 16 or 22 and a minimum dimension such as to accommodate normal operating low amplitude movements and thermal expansion during operation. As previously indicated, the end 92 of the clutch helical coil spring 84 normally does not perform any function in the operation of the one-way clutch but is provided to aid in assembly and disassembly.

It will be understood that the extent of movement required to effect the releasing and fixing of the clutch engagement can be varied in accordance with known coil spring clutch technology. Where slippage is provided, this distance would be added to the distance provided by the lost motion connection in order to establish the predetermined distance. In the embodiment shown, the slippage distance is presumed to be equal to zero so that the distance of the lost motion provided by the lost motion connection between the clutch end 90 and the notch 88 determines the predetermined distance.

As indicated in the aforesaid patent, the construction and operation of the damping means 42 is related both to the manner in which the pivoted structure 34 is mounted on the fixed structure 30 and the manner in which the spring 38 is connected between the pivoted and fixed structures. To this end, it will be noted that the spring 38 constitutes a torsional helical coil spring which is disposed within the annular space between the inner and outer tubular portions of the pivoted structure 34. One end of the torsional helical coil spring 38 is bent, as indicated at 94, to extend within a recess 96 formed in the interior surface of the end wall portion 66. The opposite end of the torsional helical coil spring 38 is bent, as indicated at 98, to extend radially outwardly through a 45° elongated opening 100 formed in the flange portion 48 of the fixed structure 30.

Mounted in sliding relation with the exterior periphery of the inner tubular portion 64 of the pivoted structure 34 is a spring bearing member, generally indicated at 102. Preferably the bearing member 102 is molded of a plastic material, a preferred plastic being Zytel. The bearing member 102 is formed with a cylindrical interior peripheral surface of a size to engage the exterior peripheral surface of the inner tubular portion 64. An annular flange 104 extends radially outwardly from the outer extremity of the bearing member 102 and is disposed in engagement with the inner surface of the end wall portion 46 of the fixed structure 30. Flange 4 may be formed at its outer periphery with an axially inwardly extending rib.

The 45° inclination of opening 100 enables the end 98 of the spring 38 to be initially mounted therein at the axially inner end thereof so that the stressing of the spring during assembly tends to move the same axially outwardly into engagement with the flange 104. The engagement of the spring end 98 with the flange serves to depress or deform the flange or rib thereof so as to positively lock the bearing member 102 thereof against rotation with respect to the fixed structure 30. However, the arrangement does not positively prevent sliding movement of the bearing member 102 in a direction transverse to the axis of rotation.

The damping mechanism 42 is in the form of a sleeve body 106 of a material such as Zytel 103HSL (nylon made by DuPont). Where Zytel is utilized as the material for the damping sleeve body 106 the damping action provided is essentially all sliding friction damping with the amount of solid damping by internal displacement being relatively insignificant.

As best shown in FIG. 3, the pivoted structure 34 includes a cylindrical interior peripheral surface 108 which extends axially therethrough and defines the interior of the inner tubular portion 64. Damping sleeve body 106 has an exterior peripheral surface 110 of a size to enable the sleeve body to fit loosely within the pivoted structure surface 108. The damping sleeve body includes an interior peripheral surface which closely engages the exterior peripheral surface of the core member 44. One end of the damping sleeve body 106 has a flange 111 which seats against the adjacent surface of the pivoted structure 34 and the inner surface of the disk 56 of the fixed structure 30.

The damping body 106 in its preferred form has a relatively tight fit at its inner periphery with the outer periphery of the core member 44, and a relatively loose fit between its exterior periphery and the interior periphery of the inner tubular portion 64 of the pivoted structure 34. Consequently, pivotal movement of the pivot structure 34 with respect to the fixed structure 30 between its limiting positions is basically accommodated by a sliding movement between the exterior peripheral surface 110 of the damping body 106 and the interior peripheral surface 108 of the inner tubular portion 64. Moreover, it can be seen that since the radial pressure between these two contacting surfaces varies in accordance with the position of the pivoted structure 34 with respect to the fixed structure 30, the amount of friction between the two contacting surfaces will likewise vary and hence the torsional force required to overcome the frictional force will likewise vary.

The arrangement is such that the vibrational environment of the engine tends to cause the damping body 106 to assume a torsionally unstressed condition between the core member 44 and inner tubular portion 64 of the pivoted structure 34. In this way, the different positions of operation which the pivoted structure 34 assumes over an extended period of use by virtue of the belt wear and extension are readily accommodated. Moreover, it will be noted that as the normal operating position of the pivoted structure 34 moves more toward the maximum takeup second limiting position with the attendant diminishing of the torsional spring effect, there is a proportional diminishing of the force required to overcome the friction between the stress contacting surfaces of the inner tubular portion 64 and damping body 106. This enables the amount of damping provided to be proportional to the amount required and insures effective damped operation throughout the entire operating range of movement of the belt tensioning device 28 throughout the life of the system 10. By proportioning the damping provided to that which is required, the extremes of too little damping at the high spring stress positions to the extent of allowing resonance or too much damping at the low spring stress positions to the extent of pulley hang-up are avoided throughout the operative range.

Referring now more particularly to FIGS. 5 and 6, there are shown therein certain modifications in the tensioning device 10 which are within the contemplation of the present invention. These modifications relate solely to the lost motion connection between the clutch helical coil spring 84 and the fixed structure 30 or other aspects of the tensioning device being the same as previously described. As best shown in FIG. 6, instead of the exterior cylindrical clutch surface being provided solely by the exterior periphery 86 of the outer tubular portion 68 of the pivoted structure 34, the clutch surface is provided in part by the portion of the exterior periphery of the outer tubular portion which is adjacent to a recess 112 formed in the exterior periphery of the outer tubular portion adjacent the disk 56. The remaining part of the exterior cylindrical clutch surface is provided by the exterior periphery 114 of a sleeve 116 slidably mounted within the recess 112. The lost motion connection is then provided between the sleeve 116 and the disk 56. Instead of providing a single notch 88 in the periphery 78 of the disk to accomplish the lost motion connection, the disk 56 has formed therin a plurality of annularly spaced notches 118, which, as shown, are three in number, being spaced equally annularly about the axis of the disk with the notch 80. The sleeve 116 is formed with a plurality of lugs 120 which extend axially outwardly therefrom into the notches 118.

It can be seen that since the clutch helical coil spring 84 is in gripping engagement both with the surface 86 and the surface 114, the end thereof effectively grippingly engages with the sleeve 116 and consequently the resultant operation will be the same as that previously described. While the arrangement shown in FIGS. 5 and 6 is somewhat more complex it does have the advantage of distributing the clutch forces more optimally than is the case with the single lost motion connection of the embodiment shown in FIGS. 1–4.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A timing belt tensioning device comprising
   a fixed structure,
   a pivoted structure mounted with respect to said fixed struture for pivotal movement about a first axis between first and second limiting positions,
   a timing belt engaging pulley rotatably carried by said pivoted structure for rotational movement about a second axis parallel with said first axis,
   spring means mounted between said fixed and pivoted structures for resiliently biasing the pivoted structure to move in a direction away from said first limiting position toward said second limiting position with a spring force that decreases as the pivoted structure is moved in a direction away from said first position toward said second position,
   one-way clutch means for permitting pivotal movement of said pivoted structure in a direction toward said second limiting position and for limiting the pivotal movement of said pivoted structure in an opposite direction toward said first limiting position beyond a predetermined distance measured from the nearest position of said pivoted structure to said second limiting position, the predetermined distance having a maximum dimension such as to prevent loosening of the timing belt engaged by said pulley sufficient to allow disengagement of a tooth thereof with a tooth of a timing pulley and a minimum dimension such as to accommodate normal operating low amplitude movements and thermal expansion during operation, and damping means for damping the operating movements of said pivoted structure permitted by said one-way clutch means.

2. A timing belt tensioning device as defined in claim 1 wherein said fixed structure includes a core member extending axially along said first axis, said pivoted structure including an inner tubular portion rotatably mounted on said core member in surrounding relation therewith and an outer tubular portion disposed in outwardly spaced surrounding relation with respect to said inner tubular portion, said spring means including a torsional helical coil spring disposed in the annular space betwen said inner and outer tubular portions, said one-way clutch means including means defining an exterior cylindrical clutch surface and a clutch helical coil spring interiorly engaged with said exterior cylindrical clutch surface, said clutch helical coil spring having a lost motion connection with said fixed structure such that when said pivoted structure is moved through said predetermined distance (1) in a direction toward said second limiting position the engagement between said clutch helical coil spring and said exterior cylindrical clutch surface is released and (2) in a direction toward said first limiting position the engagement between said clutch helical coil spring and said exterior cylindrical clutch surface is intensified to a fixed engagement.

3. A timing belt tensioning device as defined in claim 2 wherein said fixed structure includes a disk fixed to one end of said core member, said disk having notch means therein forming a part of the lost motion connection between the fixed structure and said clutch helical coil spring.

4. A timing belt tensioning device as defined in claim 3 wherein said means defining said exterior cylindrical clutch surface constitutes an integral exterior peripheral surface of said outer tubular portion and an end portion of said clutch helical coil spring is bent to extend axially, said notch means comprising a single notch in the periphery of said disk receiving the axially extending bent end of said clutch coil spring.

5. A timing belt tensioning device as defined in claim 3 wherein said outer tubular portion has a cylindrical recess formed in one end of the exterior periphery thereof, a sleeve rotatably slidably mounted within said recess having a plurality of annularly spaced lugs extending axially from an end thereof, said means defining said exterior cylindrical clutch surface comprising an integral exterior peripheral surface of said outer tubular portion adjacent said recess and a registering exterior peripheral surface of said sleeve, said notch means comprising a plurality of annularly spaced notches in the periphery of said disk receiving said lugs therein.

6. A belt tensioning device as defined in claim 3 wherein the exterior periphery of said core member and the interior periphery of said inner tubular portion are spaced apart radially so as to define therebetween an annular space, said damping means including a body in said annular space.

7. A belt tensioning device as defined in claim 6 wherein said body is formed of Zytel.

8. A belt tensioning device as defined in claim 6 wherein said torsional coil spring includes one end connected to said pivoted structure, means for operatively connecting the opposite end of said torsional coil spring to said rigid structure so that said torsional coil spring is decreasingly torsionally flexed between its ends in a manner tending to bias the volutes therebetween in a radial direction with a proportionally decreasing radial force component as said pivoted structure is moved from its first position toward its second position, and means acting between the ends of said coil spring for transmitting the aforesaid radial force component thereof through said tubular portion and said body to said core member so as to compress a portion of the body between contacting surfaces of said tubular portion and said core member with a radial component spring force which is proportional to the torsional flexure force of said spring and hence to the relative position of pivotal movement of said pivoted structure with respect to said fixed structure so that the torsional force required to effect a sliding movement betwen said body portion and a contact surface decreases as said pivoted structure is moved in a direction away from said first position toward said second position.

9. A belt tensioning device as defined in claim 8 wherein said radial component force transmitting means includes an annular member rotatably mounted on the inner tubular portion of said pivoted structure, a volute of said torsional coil spring engaging the exterior periphery of said annular member so that the radial component force is transmitted from torsional coil spring to said annular member.

10. A belt tensioning device as defined in claim 2 wherein the exterior periphery of said core member and the interior periphery of said inner tubular portion are spaced apart radially so as to define therebetween an annular space, said damping means including a body in said annular space.

11. A belt tensioning device as defined in claim 10 wherein said body is formed of Zytel.

12. A belt tensioning device as defined in claim 10 wherein said torsional coil spring includes one end connected to said pivoted structure, means for operatively connecting the opposite end of said torsional coil spring to said rigid structure so that said torsional coil spring is decreasingly torsionally flexed between its ends in a manner tending to bias the volutes therebetween in a radial direction with a proportionally decreasing radial force component as said pivoted structure is moved from its first position toward its second position, and means acting between the ends of said coil spring for transmitting the aforesaid radial force component thereof through said tubular portion and said body to said core member so as to compress a portion of the body between contacting surfaces of said tubular portion and said core member with a radial component spring force which is proportional to the torsional flexure force of said spring and hence to the relative position of pivotal movement of said pivoted structure with respect to said fixed structure so that the torsional force required to effect a sliding movement between said body portion and a contact surface decreases as said pivoted structure is moved in a direction away from said first position toward said second position.

13. A belt tensioning device as defined in claim 12 wherein said radial component force transmitting means includes an annular member rotatably mounted on the inner tubular portion of said pivoted structure, a volute of said torsional coil spring engaging the exterior periphery of said annular member so that the radial component force is transmitted from torsional coil spring to said annular member.

* * * * *